(12) United States Patent
Bitter

(10) Patent No.: US 8,352,121 B2
(45) Date of Patent: Jan. 8, 2013

(54) HITCH SYSTEM

(75) Inventor: Marcus Bitter, Mannheim (DE)

(73) Assignee: Deere & Company, Moline, IL (US)

( * ) Notice: Subject to any disclaimer, the term of this patent is extended or adjusted under 35 U.S.C. 154(b) by 240 days.

(21) Appl. No.: 12/779,282

(22) Filed: May 13, 2010

(65) Prior Publication Data

US 2011/0004372 A1    Jan. 6, 2011

(30) Foreign Application Priority Data

Jul. 3, 2009    (DE) .................... 10 2009 027 453

(51) Int. Cl.
*G06F 7/00*    (2006.01)

(52) U.S. Cl. ........................................... 701/36

(58) Field of Classification Search ........ 701/36
See application file for complete search history.

(56) References Cited

U.S. PATENT DOCUMENTS

| | | | | |
|---|---|---|---|---|
| 6,749,035 | B2 * | 6/2004 | Bundy ........................ | 180/41 |
| 6,752,403 | B2 * | 6/2004 | Allen et al. ................ | 280/6.157 |
| 2004/0026880 | A1 * | 2/2004 | Bundy ........................ | 280/6.159 |
| 2005/0236782 | A1 * | 10/2005 | Kobayashi ................. | 280/6.159 |
| 2008/0088107 | A1 * | 4/2008 | Bitter ........................ | 280/124.161 |
| 2008/0100017 | A1 * | 5/2008 | Bitter ........................ | 280/124.16 |

FOREIGN PATENT DOCUMENTS

| | | |
|---|---|---|
| DE | 19748224 | 5/1999 |
| DE | 102004033315 | 2/2006 |
| EP | 1281872 | 6/2005 |
| EP | 1175818 | 12/2007 |
| EP | 1388279 | 2/2010 |
| FR | 2560733 | 9/1985 |
| FR | 2722941 | 2/1996 |

OTHER PUBLICATIONS

European Search Report Oct. 28, 2010 (5 pages).
German Search Report Feb. 3, 2012 (5 pages).

* cited by examiner

*Primary Examiner* — Hussein A. Elchanti

(57) ABSTRACT

The invention relates to a hitch system for an agricultural vehicle for lifting and lowering a load or an attachment. The hitch system further includes a hydraulic system with a double-action hydraulic cylinder, and an electronic control unit connected to the hydraulic system for controlling the hydraulic system and the pressurization of the hydraulic cylinder. The control unit controls a contact pressure for a working device as a function of a sensed load on the axle.

3 Claims, 2 Drawing Sheets

HITCH SYSTEM

FIELD OF THE INVENTION

The present invention relates to a agricultural vehicle hydraulic hitch system for raising and lowering a load or an attachment.

BACKGROUND OF THE INVENTION

In the prior art, agricultural vehicles are known, for example, tractors or haulers, but also loader vehicles, such as telehandlers, which have hitch systems on which various attachments can be attached for performing a wide variety of tasks. Such a hitch could be arranged both on the back and also on the front. Often, it is necessary or useful to equip the attachments with a specified contact pressure on the ground, in order to operate the attachment and the vehicle at an optimized overall efficiency in their interaction. This contact pressure can involve weight being transferred selectively from the vehicle to the attachment or vice versa.

Furthermore, a hitch is known that moves slowly upward from the ground at a specified pressure, that is, are provided with a so-called floating position function with a contact pressure that can be specified.

Such hitch systems are disclosed, for example, in EP 1 281 872 B1 and DE 10 2004 033 315 A1, wherein the former discloses an electro-hydraulic hitch assembly for an agricultural work machine. The disclosed hitch assembly has available a double-action hydraulic cylinder whose two pressure chambers can be pressurized and can be controlled by means of a suitable control valve, wherein an electro-hydraulic pressure control is provided that detects the pressure by means of pressure sensors in the two pressure chambers and that controls or regulates accordingly.

DE 10 2004 033 315 A1 also discloses a hitch system with double-action hitch cylinders and a pressurized volume flow control means, wherein a pressure-limiting valve is provided through which a maximum pressure in the hydraulic system is controlled as a function of operating states of the hitch assembly or the attachment.

The systems known from the prior art have in common that they can be used as control parameters for the pressure in the working cylinder of the front power lift and therefore certain operating states can be taken into account not at all or only insufficiently for the contact pressure regulation of the hitch. Thus, with conventional contact pressure regulators, often it can be recognized only with difficulty that, for example, the attachment is no longer located on the ground. Another disadvantageous state or a case that can be detected only with difficulty is created, for example, when the vehicle loses contact with the ground or a limit in this respect is reached due to too high a contact pressure of the attachment on an axle.

SUMMARY

Accordingly, an object of this invention is to provide a hitch system which is controlled as a function of a sensed load.

This and other objects are achieved by the present invention, wherein a hitch system is provided for an agricultural vehicle having an axle. An axle load sensor senses a load on the axle and an electronic control unit generates control signals for controlling the hydraulic system as a function of the sensed axle load. A contact pressure regulation can be performed such that the pressures or forces on the hitch assembly or on the hydraulic cylinder of the hitch assembly or the hitch cannot be used as control or regulation parameters, but instead the load state on the axle allocated to the hitch can be determined and used for controlling or regulating the contact pressure. The use of the axle load allocated to the hitch as a control or regulation parameter is therefore useful, because by changing the load state on the axle, limits for a contact pressure regulation of the hitch assembly or the hitch can be detected and controlled. If, for example, a load on the axle allocated to a hitch assembly or an hitch is not to be increased further, this is an indication that the hitch assembly or the hitch has lifted the load attached to it from the ground. The ground contact pressure thus reaches an operative minimum value and the load on the axle essentially does not increase further due to geometry. In the opposite case, if the load on the axle is no longer decreasing or is even equal to zero, this is an indication that the axle or the wheels arranged on the axle have lost contact with the ground. The ground contact pressure has thus reached an operative maximum value and the load on the axle does not decrease further, because only the vehicle frame and thus the axle allocated to the hitch is raised farther from the ground. It is advantageous that for the use of the load state on the axle allocated to the hitch as the control or regulation parameter, the control and drive capacity of the vehicle can be controlled. With depressurization of the axle allocated to the hitch, the controllability (e.g., when the front axle is depressurized for a front hitch) or the traction capacity of the vehicle decreases, because the wheels can apply increasingly smaller steering or traction forces on the ground. In addition, the efficiency of an all-wheel drive is supported if it can always be taken into account that a corresponding load also lies on the axle allocated to the hitch, because sufficient traction can be generated only for a sufficient axle load. Thus, advantageously the actual characteristic parameter to be regulated, namely the load state of the axle or axle system allocated to the hitch is used directly as the control or regulation parameter. It is not attempted as usual before to influence the characteristic parameter to be regulated indirectly by means of a different regulation parameter, for example, by means of the pressure in a hydraulic cylinder of an hitch. No complicated hydraulic cylinder valve is required for a hydraulic cylinder, because in this case a standardized electro-hydraulic control valve is also sufficient.

The hitch can be a front hitch and the axle on which the load is determined can be the front axle. However, it is likewise conceivable to form a vehicle according to the invention with a rear hitch, wherein the decisive load on the rear axle can be determined. By means of suitable conversion factors, however, even for a front hitch, the load state on the rear axle can be used for controlling or regulating the hydraulic system or the contact pressure of the hydraulic system, because this involves merely the distribution of force relationships on the vehicle. Likewise it is conceivable to determine the load on the front axle and to reference this as the basis for a control or regulation of the hydraulic system or the contact pressure on a rear hitch. Advantageously, the hitch is constructed as a so-called three-point hitch.

The axle can further be a hydraulically cushioned axle, wherein one or more hydraulic cylinders or hydraulic suspension cylinders cushion the axle relative to the frame of the vehicle. The hydraulic cylinders are advantageously double-acting hydraulic storage devices, wherein both sides (chambers) of the hydraulic cylinder can each be connected to hydraulic pressure storage devices.

The load sensor may be a pressure sensor for sensing a pressure the hydraulic suspension cylinder and the axle load can be determined as a function of the pressure. Advantageously, both sides (hydraulic chambers) of the hydraulic suspension cylinder are connected to pressure sensors and are monitored continuously. The pressure signals can be sent to a microcontroller or to an electronic control unit and converted there into a resulting axle load or into a resulting load state of the corresponding axle.

In a different embodiment according to the invention, e.g., for the case where there is no cushioned front axle, other means could also be provided for detecting load, such as a strain gauge which senses axle deflection and the axle load can be determined as a function of the deflection on the axle.

In an additional embodiment according to the invention, the load sensor may be a strain gauge which senses deflection of a frame part of the vehicle, and the axle load can be determined as a function of the deflection on the frame part.

Furthermore, it is possible that at least one chamber of the hydraulic cylinder can be connected by means of a controllable switch valve to a hydraulic tank. Therefore it is guaranteed that, for example, even for a power lift of a front hitch formed as a double-action hydraulic cylinder with reference to a simple, economical switch valve that connects, for example, the lowering side of the (front) power lift to a hydraulic tank, it is possible to operate the (front) power lift in the "traditional" simple operation, wherein a part of the functionality of the control or regulation remains as a function of the load state determined on the axle of the vehicle.

Preferably, only two pressure sensors (one for each side or hydraulic chamber) on the suspension cylinder are required to make possible the required control or regulation. Complicated sensors and valve controllers are not needed to the degree as is known in the prior art, so that there is a cost advantage. In comparison with systems known from the prior art, no volume flow must be discharged with loss via an excess pressure valve, so that the vehicle according to the invention or the provided hydraulic system (hydraulic device) is also associated with advantages with respect to energy and thus fuel consumption. The provided hydraulic system (hydraulic device) here guarantees not only a control or regulation of individual components, but also takes into account and monitors or influences the performance of the entire vehicle system, so that undesired vehicle states can be automatically prevented and furthermore optimum operating ranges of the vehicle can be maintained. By monitoring or controlling and regulating an essential characteristic parameter of the vehicle, namely the load state on the corresponding axle equipped with the hitch, a control or regulation system could be easily integrated into comprehensive vehicle and/or attachment control systems or regulation systems. Therefore, because there is also no uncontrolled outflow of hydraulic fluid from the hydraulic cylinder of the hitch, the risk of cavitation in the hydraulic cylinders of the hitch can be significantly reduced, which improves the regulation quality and reduces damages caused by cavitation.

DESCRIPTION OF THE PREFERRED EMBODIMENT

Figure 1:
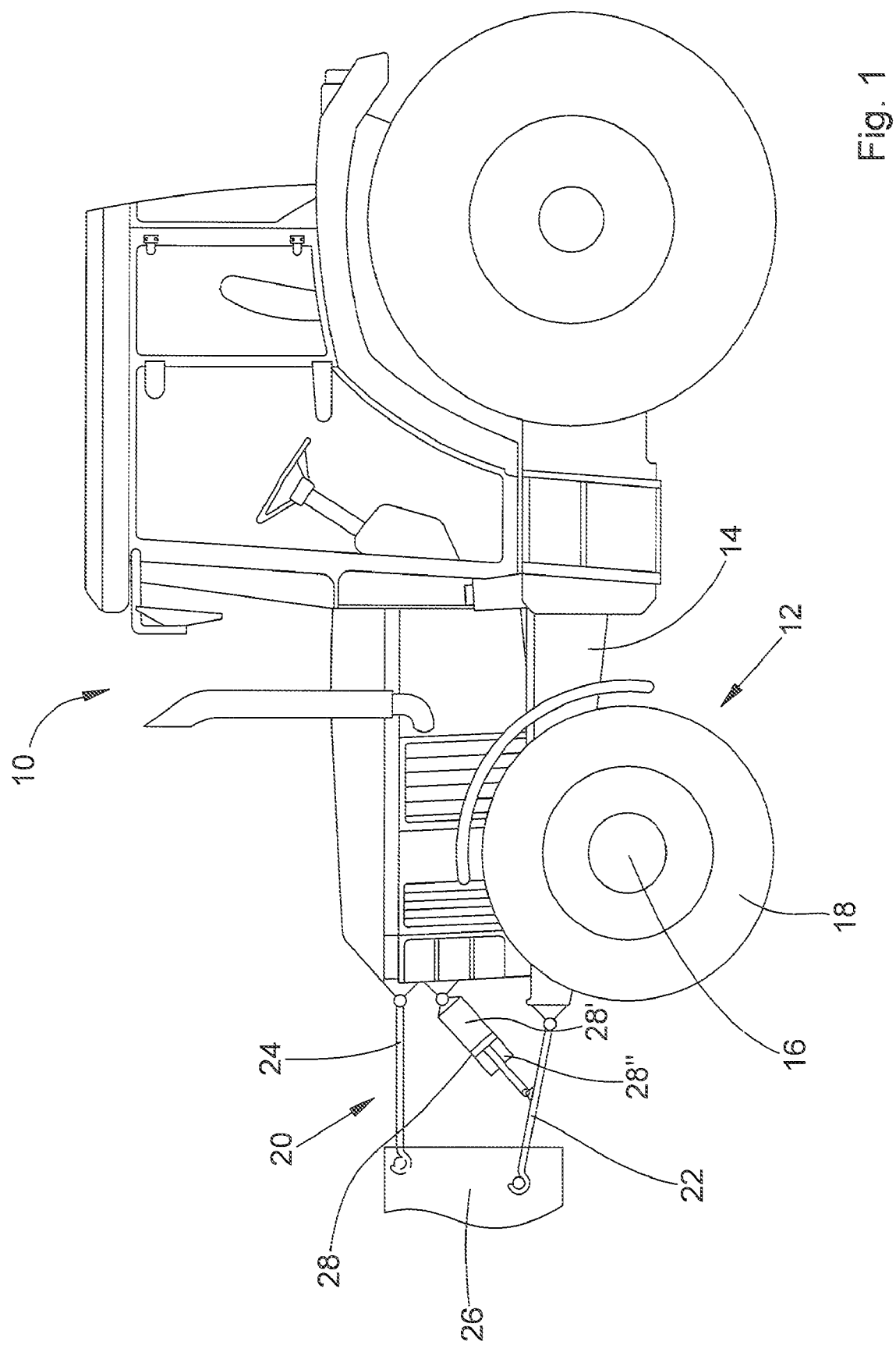
FIG. 1 is a schematic side view of a vehicle according to the invention with a hydraulic front hitch system.

Referring to FIG. 1, an agricultural vehicle 10, such as a hauler or tractor, or other agricultural vehicles, such as, e.g., telehandlers, includes an axle system 12 with an axle 16 that is cushioned hydraulically on a frame 14 of the vehicle 10 which is equipped with driven or non-driven wheels 18.

The vehicle 10 further includes a front hitch or hitch 20, although it could be a rear hitch. The front hitch 20 may be a three-point hitch with two lower linkages 22 (only one is to be seen) and one upper linkage 24 for attaching a working device 26. The lower linkages 22 are each connected to a double-action hydraulic power lift or hydraulic cylinder 28 that is mounted on the vehicle 10, advantageously on the frame 14 of the vehicle 10 and that includes a first hydraulic chamber 28' and a second hydraulic chamber 28". In the shown embodiment, the first chamber 28' is constructed on the lowering side, but the second chamber 28" is constructed, in contrast, on the hitch side.

The axle system 12 is constructed such that both an oscillating motion and also a vertical motion of the axle 16 relative to the frame 14 is possible. The axle system 12 further includes two hydraulic cylinders 30, 32 that are arranged on two sides of the oscillating axle 16 and connect these to the frame 14. The two hydraulic cylinders 30, 32 represent the hydraulic suspension cylinders that each have two hydraulic chambers 30', 30" and 32', 32", respectively, wherein the chambers 30' and 32' are connected to a first hydraulic storage device 34 and the chambers 32' and 32" are connected to a second hydraulic storage device 36.

Figure 2:
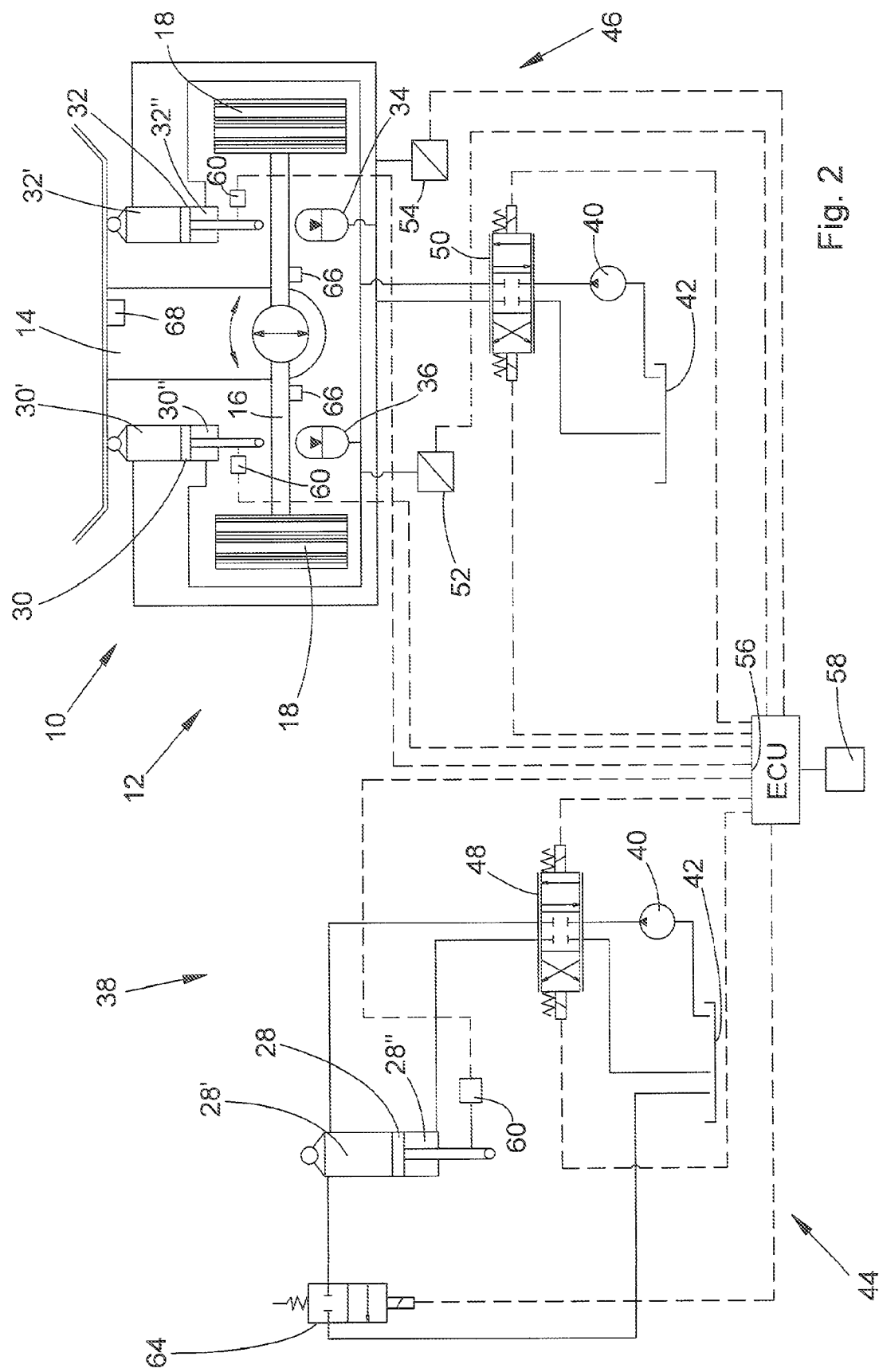
FIG. 2 is a schematic hydraulic diagram of a hydraulic system for the hitch system of FIG. 1.

Referring now to FIG. 2, the vehicle 10 further includes a hydraulic system 38, which includes hydraulic cylinders 28, 30, 32. The control of these cylinders and other hydraulic and electric components relevant to the control or regulation will be explained below.

The hydraulic system 38 includes a hydraulic pump 40 which supplies hydraulic fluid to both the hydraulic cylinder 28 of the hitch and also the hydraulic cylinders 30, 32 of the axle system 12 as well as the hydraulic storage devices 34, 36 connected to the hydraulic cylinders 30, 32. Furthermore, a hydraulic reservoir or hydraulic tank 42 is provided into which excess hydraulic fluid can be discharged or required hydraulic fluid can be drawn (pumped). The hydraulic system includes a first hydraulic circuit 44 allocated to the hitch 20 and a second hydraulic circuit 46 that is allocated to the axle system 12 or to the suspension system of the axle system 12. Both circuits 44, 46 are supplied from the same hydraulic pump 40 and the same hydraulic tank 42, wherein this can also be performed with correspondingly separated components.

The hydraulic circuit 44 includes a control valve 48 which is preferably an electronically controllable proportional valve. By means of the control valve 48, the two chambers 28', 28" of the hydraulic cylinders 28 can be electronically controlled selectively to be hydraulically connected to or separated from the hydraulic tank 42 or the hydraulic pump 40.

The hydraulic circuit 46 includes a control valve 50 which is preferably an electronically controllable proportional valve. In an alternative embodiment, the control valve 50 could also be a simple On/Off valve. By means of the control valve 50, the two chambers 30', 30" and 32', 32" of the two hydraulic cylinders 30, 32 can be selectively electronically controlled to be connected to or separated from the hydraulic tank 42 or the hydraulic pump 40. A hydraulic connection of the two chambers 30', 30", 32', 32" to the hydraulic storage devices 34, 36 allows a cushioned oscillating motion against a hydraulic pressure applied by the hydraulic storage devices 34, 36. In order to detect the pressure building up in the chambers 30', 30", 32', 32" of the hydraulic cylinders 30, 32, pressure sensors 52, 54 are provided, wherein the pressure sensor 52 detects the pressure in the chambers 30' and 32' connected in parallel to each other and the pressure sensor 54 detects the pressure in the chambers 30" and 32" connected in parallel to each other. Furthermore, the chambers 30', 30", 32', 32" could also be connected to each other in crossing connections (not shown), in order to realize anti-roll control, wherein then the chamber 30' is connected to the chamber 32" and the chamber 30" is connected to the chamber 32'.

Furthermore, an electronic control unit 56 generates control signals for controlling the control valves 48, 50 and receives sensor signals for generating corresponding control signals for the control valves 48, 50 from the pressure sensors 52, 54. The control unit 56 is connected to an input device 58 by means of which additional, different parameters that are needed or that are relevant for generating the control signals for the control valves 48, 50 can be specified or retrieved. For example, by means of this configuration, an operator could also activate or deactivate one or the other hydraulic circuit 44, 46. Furthermore, defaults for thresholds or limits could be input that are taken into account by the electronic control unit for the generation of control signals. For example, the operator could input which contact pressure on the hitch 20 is desired while operating a work device 26 or is to be set by the electronic controller 56.

As already mentioned above, the hydraulic cylinders 30, 32 on the axle system 12 (cushioned front axle) are connected to hydraulic storage devices 34, 36 on both chambers 30', 30" or 32', 32", wherein on both hydraulic cylinders 30, 32, both chambers 30', 30" or 32', 32" are also monitored continuously with pressure sensors 52, 54. The signals of the pressure sensors 52, 54 on the axle system 12 here reflect the load state on the axle, such that a change to the pressure signals points to a change in the load state, or conversely, that no change to the pressure signals points to the fact that a limit state has been reached on the axle system. Thus, for example, the pressure in the hydraulic cylinders 30, 32 can fall to a minimum, which points to the fact that the wheels 18 of the vehicle are losing or have lost their contact with the ground and the vehicle 10 is thus incapable of maneuvering, wherein a minimum load state on the axle 16 is reached.

On the other hand, for example, the pressure in the hydraulic cylinders 30, 32 could rise to a maximum, which points to the fact that the work device 26 has been raised completely or almost completely from the hitch 20 and, in this respect, a maximum load state is achieved on the axle 16, wherein the contact pressure on the work device 26 is equal to zero. The pressure sensor signals form the basis for the generation of the control signals for the control valves 48 and/or 50, wherein the pressure signals are converted by means of an algorithm stored in the control unit 56 into a resulting axle load or into a resulting load state on the axle 16. With reference to the calculated load state, the contact pressure prevailing on the work device 26 can be determined and a corresponding control signal can be generated by the control unit for maintaining a desired contact pressure specified by the input device 58. Here, the hydraulic control valve 48 that is used for raising and lowering the hydraulic cylinder 28 or the front power lift is controlled accordingly. The hydraulic cylinder 28 or the front power lift then travels into its position such that the required contact pressure is set. It is simultaneously detected and continuously checked whether the limit state mentioned above is set in which the contact of the wheels 18 to the ground falls below an arbitrary, specified measure (for example, also specified by means of the input device 58), so that optionally the contact pressure is automatically reduced by the electronic control unit. The control valve 48 is preferably a well known valve which has corresponding control edges which prevent cavitation in the hydraulic cylinder 28. However, this belongs to the prior art and does not have to be discussed here further.

In order to be able to better judge the axle load position and the system behavior, it is conceivable to also process a position signal of the cushioned axle system 12. For this purpose, position sensors 60 can be provided. The inclusion of a position signal supplied by another position sensor 62 for the position of the hydraulic cylinder 28 or the front power lift for judging the behavior or state of the overall system can likewise be considered helpful, because it can be estimated a priori how large the possible changes to the load state on the axle 16 could still become.

As another input parameter in a possible control or regulation algorithm stored in the electronic control unit 56, the status of a rear power lift on a rear-side hitch (not shown) could be used, which likewise has an influence on the load state of the front axle due to its movements and measurements (for example, in the scope of a tensile-force regulation).

Also, if an operator always wants to cancel the double-action function of the hydraulic cylinder 28 or front power lift under certain conditions, then he could also specify these by means of the input device 58. For this purpose, a switch valve 64 is provided in the supply line to the lowering side of the hydraulic cylinder 28. The switch valve 64 switches electrically to depressurize the chamber 28' to the hydraulic tank 42. With this depressurization to the hydraulic tank, it is then indeed no longer possible to extend the hydraulic cylinder 28 or to also press the hitch 20 onto the ground, in order to depressurize the axle 16 selectively up to a maximum state, but it is still possible to change (or to load or to depressurize) the axle load of the front axle in the scope of the "normal" contact pressure caused by the dead weight of the hitch 20 and the work device 26 coupled to this device. Thus the function of a simple action hydraulic cylinder 28 or front power lift is possible, as is known from the tensile-force regulation of rear power lifts on a rear hitch. Furthermore, it is also conceivable to provide on the control valve 48 a fourth valve position (not shown) in which a floating position is realized for the hydraulic cylinder 28, wherein both chambers 28', 28" are depressurized to the tank.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims. Thus, for example, strain gauges 66, 68 on the axle 16 or on the frame 14 of the vehicle 10 could also be provided that are used as signal generators for determining or calculating the load state on the axle 16 for controlling the control valves 48, 50.

We claim:

1. A control system for an agricultural vehicle having a hitch for lifting and lowering a work implement, a hydraulically suspended axle including a hydraulic suspension cylinder, a double acting hydraulic cylinder for lifting and lowering the hitch, a control unit generating electronic control signals which control pressurization of the hydraulic cylinder, characterized by:

a load sensor for sensing a load on the hydraulically suspended axle, the control unit generating the control signals for controlling the hydraulic cylinder as a function of the sensed load of the hydraulically suspended axle; and the load sensor comprises a pressure sensor which senses the pressure of the hydraulic suspension cylinder, wherein the load on the axle is determined as a function of said pressure and wherein a pressure which the implement applies to the ground is controlled as a function of the sensed load on the axle.

2. The control system of claim 1, wherein:
the hitch is a front hitch and the axle is a front axle.

3. The control system of claim 1, wherein:
a chamber of the hydraulic cylinder is connected to a hydraulic tank by a controllable switch valve.

* * * * *